(12) United States Patent
Tsurumaki

(10) Patent No.: US 11,577,534 B2
(45) Date of Patent: Feb. 14, 2023

(54) SHEET MEMBER INCLUDING PHOSPHORESCENT LAYER AND REFLECTION LAYER

(71) Applicant: Takahiko Tsurumaki, Gosen (JP)

(72) Inventor: Takahiko Tsurumaki, Gosen (JP)

( * ) Notice: Subject to any disclaimer, the term of this patent is extended or adjusted under 35 U.S.C. 154(b) by 254 days.

(21) Appl. No.: 16/633,550

(22) PCT Filed: Jul. 25, 2017

(86) PCT No.: PCT/JP2017/026920
§ 371 (c)(1),
(2) Date: Jan. 23, 2020

(87) PCT Pub. No.: WO2019/021378
PCT Pub. Date: Jan. 31, 2019

(65) Prior Publication Data
US 2020/0207134 A1    Jul. 2, 2020

(51) Int. Cl.
| | | |
|---|---|---|
| *B32B 3/10* | (2006.01) | |
| *B32B 7/023* | (2019.01) | |
| *B41M 3/06* | (2006.01) | |
| *B41M 3/00* | (2006.01) | |
| *C09D 11/037* | (2014.01) | |

(52) U.S. Cl.
CPC ............. *B41M 3/06* (2013.01); *B41M 3/008* (2013.01); *C09D 11/037* (2013.01)

(58) Field of Classification Search
None
See application file for complete search history.

(56) References Cited

U.S. PATENT DOCUMENTS

| | | | |
|---|---|---|---|
| 5,415,911 A | 5/1995 | Zampa et al. | |
| 2010/0285284 A1* | 11/2010 | LaCourse | C09K 11/7734 428/195.1 |

FOREIGN PATENT DOCUMENTS

| | | | | |
|---|---|---|---|---|
| JP | 07248536 | A | * | 9/1995 |
| JP | 3023488 | U | | 4/1996 |
| JP | H1186503 | A | | 3/1999 |
| JP | 2000079753 | A | | 3/2000 |
| JP | 2001166716 | A | * | 6/2001 |
| JP | 2003255869 | A | | 9/2003 |
| JP | 2004167889 | A | | 6/2004 |
| JP | 2010015034 | A | | 1/2010 |
| JP | 2016095346 | A | * | 5/2016 |

(Continued)

OTHER PUBLICATIONS

English language translation of JP 2001-116716 A from EPO website. (Year: 2001).*

(Continued)

*Primary Examiner* — Leslie J Evanisko
(74) *Attorney, Agent, or Firm* — Withrow & Terranova, P.L.L.C.; Vincent K. Gustafson

(57) ABSTRACT

Provided is a production method of a sheet member, including a process of forming, by printing, a phosphorescent layer containing a phosphorescent material on a surface of a sheet-shaped substrate with a transmissive property, and a process of forming a reflection layer, by printing, including a reflective material to reflect light on a surface of at least either one of the substrate or the phosphorescent layer in such a manner that the reflection layer overlaps at least a part of the phosphorescent layer in a thickness direction of the substrate.

4 Claims, 4 Drawing Sheets

(56) References Cited

FOREIGN PATENT DOCUMENTS

KR          200318757 Y1  *   7/2003
KR          101726545 B1  *   4/2017

OTHER PUBLICATIONS

Author Unknown, "(4) Features of the main printing process," The Latest Printing Technology Practical Application Booklet, Special Printing Technology vol. 2, Nov. 2003, Anhui Audiovisual Publishing House, p. 595.
Second Office Action for Chinese Patent Application No. 201780093557.6, dated Jul. 23, 2021, 17 pages.
Notice of Reasons for Refusal for Japanese Patent Application No. 2019532257, dated Aug. 31, 2021, 12 pages.
International Search Report (Translation of Form PCT/ISA/210) for International Application No. PCT/JP2017/026920, dated Aug. 29, 2017, 2 pages.
Notification of Transmittal of Translation of the International Preliminary Report on Patentability Form PCT/IB/338), International Preliminary Report on Patentability (Form PCT/IB/373), and Translation of Written Opinion of the International Searching Authority (PCT/ISA/237) for International Application No. PCT/JP2017/026920, dated Feb. 6, 2020, 8 pages.
First Office Action for Chinese Patent Application No. 201780093557.6 dated Feb. 1, 2021, 19 pages including English translation.
Notice of Reasons for Rejection for Chinese Patent Application No. 201780093557.6, dated Nov. 2, 2021, 15 pages.
Decision of Refusal for Japanese Patent Application No. 2019532257, dated Feb. 22, 2022, 8 pages.

* cited by examiner

SHEET MEMBER INCLUDING PHOSPHORESCENT LAYER AND REFLECTION LAYER

CROSS-REFERENCE TO RELATED APPLICATION(S)

This application is the U.S. national phase under 35 U.S.C. § 371 of International Application No. PCT/JP2017/026920 filed on Jul. 25, 2017, wherein the entire contents of the foregoing application are hereby incorporated by reference herein.

TECHNICAL FIELD

The present disclosure relates to a sheet member including a phosphorescent material.

BACKGROUND ART

Conventionally, a printing technology has been proposed in which an ink including a phosphorescent material is used as shown in Patent Document 1.

PRIOR ART DOCUMENTS

Patent Documents

Patent Document 1: Japanese Unexamined Patent Application Publication No. 2004-167889

SUMMARY OF THE INVENTION

Problems to be Solved by the Invention

Emitted light from a phosphorescent material is less bright than emitted light from a light emitter that consumes energy. Accordingly, there has been a demand for a method enabling the emitted light from the phosphorescent material to be visible as brightly as possible.

In one aspect of the present disclosure, it is preferred to provide a phosphorescent sheet enabling emitted light from phosphorescent material to be distinctly visible.

Means for Solving the Problems

One aspect of the present disclosure is a production method of a sheet member, which comprises a process of forming, by printing, a phosphorescent layer containing a phosphorescent material on a surface of a sheet-shaped substrate with a transmissive property, and a process of forming, by printing, a reflection layer comprising a reflective material to reflect light on a surface of at least either one of the substrate or the phosphorescent layer in such a manner that the reflection layer overlaps at least a part of the phosphorescent layer in a thickness direction of the substrate.

The sheet member produced by such a production method can make light from the phosphorescent layer brightly visible to a person looking at the sheet member since light emitted from the phosphorescent layer is reflected by the reflection layer. Forming the reflection layer by printing allows the reflection layer to be formed with a high degree of freedom. Consequently, it is easily achieved to brighten only a part of the sheet member and/or to form a pattern or a shape by light on the sheet member.

Another aspect of the present disclosure is a sheet member that comprises a sheet-shaped substrate with a transmissive property, a phosphorescent layer provided on a surface of the substrate and containing a phosphorescent material, and a reflection layer provided on a surface of at least either one of the substrate or the phosphorescent layer in such a manner that the reflection layer overlaps at least a part of the phosphorescent layer in a thickness direction of the substrate. The reflection layer comprises at least a reflective material to reflect light.

This sheet member can make light from the phosphorescent layer brightly visible to a person looking at the sheet member since light emitted from the phosphorescent layer is reflected by the reflection layer.

The above-described reflective material may contain at least either a pearl pigment or an aluminum paste. This allows the reflection layer to highly reflect the light emitted from the phosphorescent layer. Also, deterioration of appearance of the sheet member can be inhibited.

A further aspect of the present disclosure is a sheet member that comprises a sheet-shaped substrate with a transmissive property, a phosphorescent layer provided on a surface of the substrate and containing a phosphorescent material, and a reflection layer provided on a surface of the phosphorescent layer on a side opposite to a side where the substrate is positioned, wherein the reflection layer comprises at least either a metal deposited film or an aluminum foil.

This sheet member can make light from the phosphorescent layer brightly visible to a person looking at the sheet member since light emitted from the phosphorescent layer is reflected by the reflection layer.

Yet another aspect of the present disclosure is a sheet member that comprises a sheet-shaped substrate with a transmissive property, a phosphorescent layer provided on a surface of the substrate and containing a phosphorescent material, and a reflection layer provided on a surface of the phosphorescent layer on a side opposite to a side where the substrate is positioned, wherein at least a surface of the reflection layer that faces the phosphorescent layer comprises white paper.

This sheet member can make the light from the phosphorescent layer brightly visible for a person looking at the sheet member in a similar manner to the above-described sheet member.

EXPLANATION OF REFERENCE NUMERALS

Figure 1:
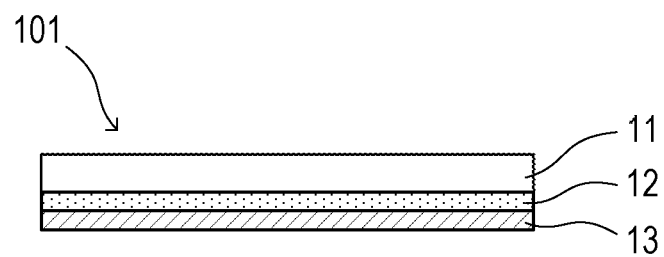
FIG. 1 is a side sectional view showing one example of a sheet member.

11 . . . substrate, 12 . . . phosphorescent layer, 13 . . . reflection layer, 101, 102, 103, 104, 105, and 107 . . .

sheet members, 201 and 202 . . . inks, 211 . . . pressure roller, 212 . . . plate, 213 . . . doctor blade

MODE FOR CARRYING OUT THE INVENTION

Embodiments of the present disclosure will be described hereinafter with reference to the accompanying drawings. It is to be understood that each described below is merely one form of the present disclosure, and the present disclosure is not limited to the embodiments, but may be implemented in various forms within the technical scope of the present disclosure. Sheet members disclosed in the drawings are schematic, and shape or thickness of any sheet member is not limited to that shown in the drawings.

1. Configuration of Sheet Member

FIG. 1 shows one example of a sheet member 101 of the present disclosure. The sheet member 101 shown in FIG. 1 comprises a substrate 11, a phosphorescent layer 12, and a reflection layer 13. The sheet member may be in a form of, for example, paper, cloth, plastic film, or thin plate, having a small thickness and a large area.

In the sheet member 101, the phosphorescent layer 12 is provided on one surface of the substrate 11. The reflection layer 13 is provided on a surface of the phosphorescent layer 12 on a side opposite to a side where the substrate 11 is positioned. Specifically, the substrate 11, the phosphorescent layer 12, and the reflection layer 13 are layered in this order in the sheet member 101.

<Substrate>

The substrate 11 is a sheet-shaped member and has light transmissivity. For example, the substrate 11 may have such a degree of transmissivity that allows light emitted from a below-described phosphorescent material to be visible through the substrate 11.

For materials of the substrate 11, for example, transparent or translucent thin plate-like resin or glass may be employed. Specifically, examples of the materials of the substrate 11 may include polypropylene, polyethylene, polyester, nylon, vinyl chloride, polycarbonate, polyvinyl alcohol, acrylic, cellophane, polystyrene, and Japanese paper.

<Phosphorescent Layer>

The phosphorescent layer 12 comprises a phosphorescent material and a retaining material to retain the phosphorescent material.

The phosphorescent material is a material that stores light, such as visible light and UV light, and electromagnetic waves, and has a light emitting property. For example, phosphorescent materials obtained by adding materials such as cerium, europium, neodymium and dysprosium for changing a light emitting status to strontium aluminate (such as $SrAl_2O_4$) as a main material may be used. However, the phosphorescent materials are not limited to these.

The retaining material is a material that retains the phosphorescent material, and has light transmissivity to allow the phosphorescent material to accumulate light and to emit light. Examples of the retaining materials may include gloss varnish, matt varnish, abrasion-resistant varnish, antistatic varnish, anti-blocking varnish, drying oil, paints, and adhesives.

<Reflection Layer>

The reflection layer 13 reflects light at least at its surface facing the phosphorescent layer 12. A specific example of a configuration of the reflection layer 13 is described below.

(i) The reflection layer 13 may be configured by an ink layer comprising at least either one of a pearl pigment or an aluminum paste, as a reflective material configured to reflect light.

Here, the pearl pigment is a pigment to provide a sheet with a pearly luster appearance. For example, mica particles coated with titanium dioxide may be the pearl pigment. However, the pearl pigment is not limited to this. A variety of pigments capable of utilizing multiple reflection and/or interference phenomenon of light may be used as the pearl pigment.

The ink layer is a layer formed of a material having light transmissivity, such as a medium, that retains the pearl pigment and/or the aluminum paste.

(ii) The reflection layer 13 may be at least either one of a metal deposited film or an aluminum foil.

The metal deposited film is a film on which a metal such as aluminum is vapor deposited by vapor deposition. The aluminum foil, which is a foil made of aluminum, may be made from not only aluminum alone but also other materials combined.

(iii) For the reflection layer 13, white paper may be used to form at least a surface of the reflection layer 13 to face the phosphorescent layer 12. Examples of the white paper may include Western paper, Japanese paper, pearly film, milky-white film and the like.

(iv) As the reflection layer 13, a metal deposited layer formed by metal deposition may be used.

2. Specific Arrangement of Reflection Layer

The phosphorescent layer 12 is provided on at least a part of at least one surface of the substrate 11. The reflection layer 13 is arranged on at least either one of the substrate 11 or the phosphorescent layer 12 in such a manner that the reflection layer 13 overlaps at least a part of the phosphorescent layer 12 in a thickness direction. The thickness direction here means a thickness direction of the substrate 11, in other words, a direction orthogonal to a spreading surface of the substrate 11. The thickness direction is also a thickness direction of the phosphorescent layer 12 and reflection layer 13.

For example, as a sheet member 101 shown in FIG. 1, the phosphorescent layer 12 and the reflection layer 13 may completely overlap each other. Also, for example, as a sheet member 102 shown in FIG. 2, the reflection layer 13 may be provided to cover the phosphorescent layer 12 and even areas where the phosphorescent layer 12 is not provided. Further, as a sheet member 103 shown in FIG. 3, the reflection layer 13 may be provided only in some parts of an area where the phosphorescent layer 12 is provided.

The reflection layer 13 comprises at least a part arranged to overlap the phosphorescent layer 12, but the reflection layer 13 may also be arranged in areas of the substrate 11 where the phosphorescent layer 12 is not formed.

Configurations of the sheet member described above are only examples, and the sheet member may have various configurations other than those described above. The configurations of the sheet members exemplified in FIG. 1 to FIG. 3 may be present in a mixed manner in one sheet member.

Hereinafter, configurations of the sheet member will be described with reference to plan views of FIG. 4 and FIG. 5.

Figure 3:
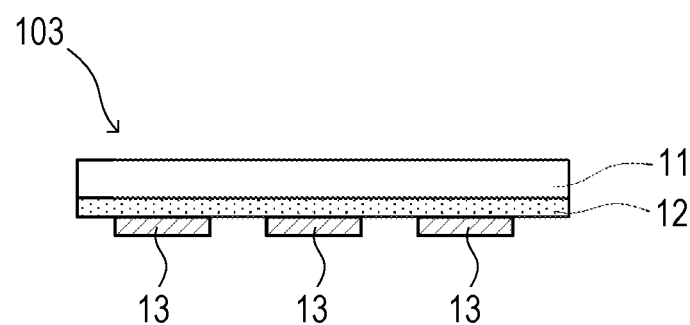
FIG. 3 is a side sectional view showing one example of a sheet member.
Figure 4:
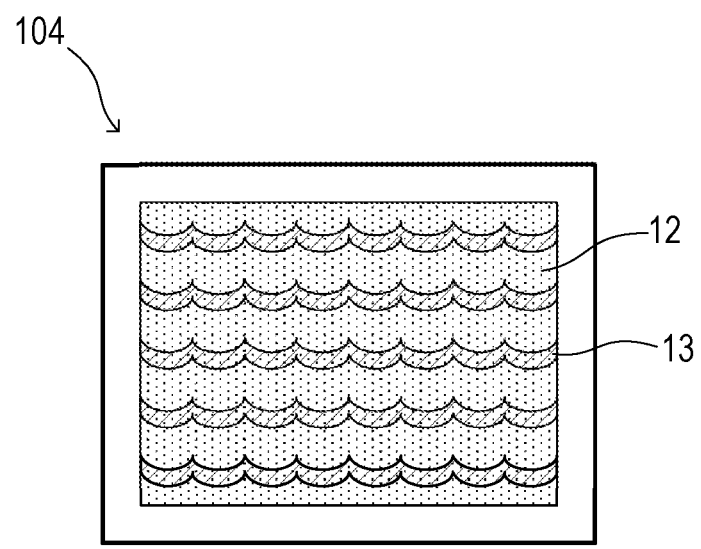
FIG. 4 is a plan view showing one example of a sheet member.

In a sheet member 104 shown in FIG. 4, the reflection layer 13 is provided in some parts of an area where the phosphorescent layer 12 is provided so as to form a pattern. The phosphorescent layer 12 and the reflection layer 13 in the sheet member 104 are in a positional relationship similar to that between the phosphorescent layer 12 and the reflection layer 13 in the sheet member 103 in FIG. 3.

With this configuration, only in the parts where the reflection layer 13 is provided, brightness is improved because emitted light from the phosphorescent layer 12 is reflected; thus, variation in brightness can be achieved. In the sheet member, figures, characters, symbols and the like may be formed by the reflection layer.

Figure 5:
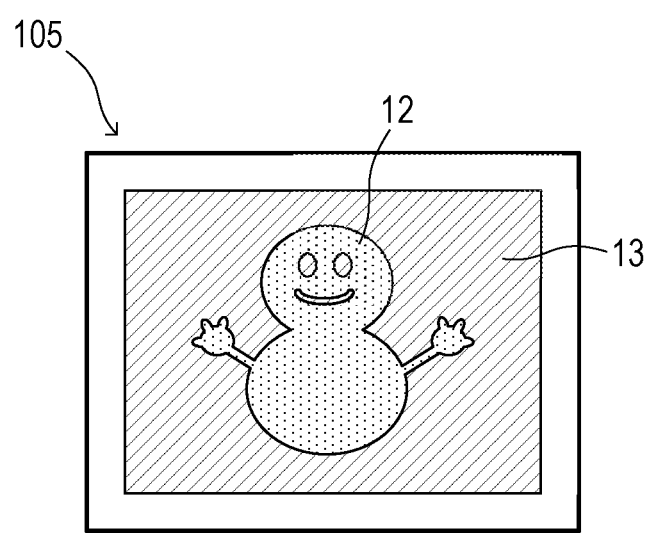
FIG. 5 is a plan view showing one example of a sheet member.

In a sheet member 105 shown in FIG. 5, the phosphorescent layer 12 is provided to form a figure, and the reflection layer 13 is provided so as to cover the figure. In other words, the phosphorescent layer 12 is provided so as to form the figure in some parts of an area where the reflection layer 13 is provided. The phosphorescent layer 12 and the reflection layer 13 in the sheet member 105 are in a relationship similar to that between the phosphorescent layer 12 and the reflection layer 13 in the sheet member 102 in FIG. 2.

In this case, when surroundings are bright, a color of the reflection layer 13 is visible, and when the surroundings are dark, a shape of phosphorescent layer 12 is visible because of light emitted from the phosphorescent layer 12. The light emitted from the phosphorescent layer 12 is reflected by the reflection layer 13, which is arranged behind the phosphorescent layer 12. Thus, the light emitted from the phosphorescent layer 12 is visible more distinctly than in a case where the reflection layer 13 is not provided. In the sheet member, a pattern, characters, symbols and the like may be formed by the phosphorescent layer.

3. Production of Sheet Member

There is no particular limitation to a specific production method of the sheet member, and for example, a method appropriately corresponding to a specific configuration of the phosphorescent layer 12 and the reflection layer 13 may be employed. Hereinafter, an example of a specific process of producing a sheet member will be described.

(1) Production of Sheet Member by Printing

In a first process, the phosphorescent layer 12 is formed on a surface of the substrate 11. The phosphorescent layer 12 may be formed by printing a retaining material containing a phosphorescent material on the surface of the substrate 11.

In a subsequent second process, a reflection layer is formed by printing on a surface of the phosphorescent layer 12 on a side opposite to a side where the substrate 11 is positioned. Forming the reflection layer by printing is particularly convenient when the reflection layer is formed of an ink layer comprising the reflective material as previously described.

Examples of printing to form the phosphorescent layer 12 on the substrate 11 may include, specifically, gravure printing, silk-screen printing, pad printing and the like. However, such printing may be implemented by various methods capable of printing by using ink containing a phosphorescent material. When gravure printing is performed, a cell size may be adjusted to conform to, for example, a size of the phosphorescent material.

When the reflection layer 13 is formed by printing, printing by the above-described gravure printing may be performed similarly to the phosphorescent layer 12. The reflection layer 13 may of course be formed by another method.

Figure 6:
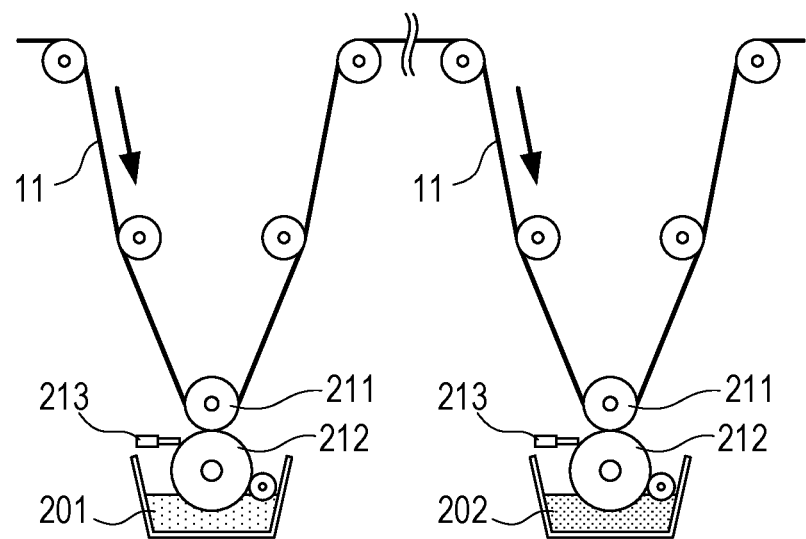
FIG. 6 is a view illustrating a production method of a sheet member by gravure printing.

When the sheet member is produced by gravure printing, as shown in FIG. 6, printing is firstly performed on the substrate 11 using an ink 201 (such as a medium containing phosphorescent material) for forming the phosphorescent layer 12. A pressure roller 211, a plate 212, a doctor blade 213, and other components may be used for printing the substrate 11. After this process, the reflection layer 13 can be printed on the substrate 11 using an ink 202 for forming the reflection layer 13.

(2) Other Methods

The phosphorescent layer 12 and the reflection layer 13 may be formed by application, besides printing. A film configuring the phosphorescent layer 12 and the reflection layer 13 may be prepared and superposed on the substrate 11. In such case, the substrate 11, the phosphorescent layer 12, and the reflection layer 13 may be integrally formed by glueing, pressure bonding, heat sealing and the like.

When a metal deposited film is used as the reflection layer 13, the metal deposited film may be arranged on the substrate 11 by glueing, pressure bonding, heat sealing and the like.

When an aluminum foil is used as the reflection layer 13, the aluminum foil may be arranged on the substrate 11 by glueing, pressure bonding, and the like.

As described above, the phosphorescent layer 12 may be arranged on the surface of the substrate 11 prior to the reflection layer 13; however, for example, a sheet comprising the phosphorescent layer 12 arranged on a surface of the sheet-shaped reflection layer 13 may be arranged on the substrate 11 in such a manner that a side provided with the phosphorescent layer 12 faces the substrate 11.

4. Effects

According to the above detailed embodiments, the following effects can be obtained.

Figure 2:
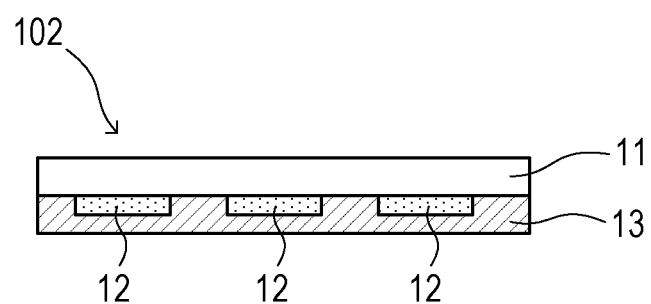
FIG. 2 is a side sectional view showing one example of a sheet member.

(4a) In the above-described sheet member, light emitted from the phosphorescent layer 12 is reflected by the reflection layer 13, and thus the light from the phosphorescent layer 12 can be brightly visible to a person looking at the sheet member from a side where the substrate 11 is provided (an upper side in each of FIG. 1 to FIG. 3).

(4b) Forming the reflection layer 13 by printing allows the reflection layer 13 to be formed at a high degree of freedom. Consequently, it is easily achieved to brighten only a part of the sheet member, or to form patterns and/or shapes by light on the sheet member.

(4c) Using either one of pearl pigment or aluminum paste as a reflective material included in the reflection layer 13 allows the reflection layer 13 to highly reflect the light from the phosphorescent layer 12. Also, deterioration of appearance of the sheet member can be inhibited.

(4d) When a metal deposited film, an aluminum foil, or a metal deposited layer is used as the reflection layer 13, the reflection layer 13 highly reflects light, and also can shield the phosphorescent layer from an outside; thus, deterioration of appearance of the phosphorescent layer 12 can be inhibited.

5. Other Embodiments

It is to be understood that although embodiments of the present disclosure have been described above, the present disclosure is not limited to the aforementioned embodiments, but may be implemented in various forms within technical scope of the present disclosure.

(5a) Respective materials for forming the substrate 11, the phosphorescent layer 12, and the reflection layer 13 are not limited to materials described in the aforementioned embodiments, and suitable adjustments such as addition of other materials may be performed. A layer and/or a substance other than the above-described phosphorescent layer 12 and reflection layer 13 may arranged among the substrate 11, the phosphorescent layer 12, and the reflection layer 13. For example, colorant such as pigment may be contained in one or more of the substrate 11, the phosphorescent layer 12, and the reflection layer 13. Moreover, the sheet member may be provided with a colored layer besides the substrate 11, the phosphorescent layer 12, and the reflection layer 13.

(5b) Although the aforementioned embodiments exemplified configurations in which the phosphorescent layer 12 and the reflection layer 13 are arranged on only one surface of the substrate 11, the phosphorescent layer 12 may be arranged on a surface of the substrate 11 different from that where the reflection layer 13 is arranged.

Figure 7:
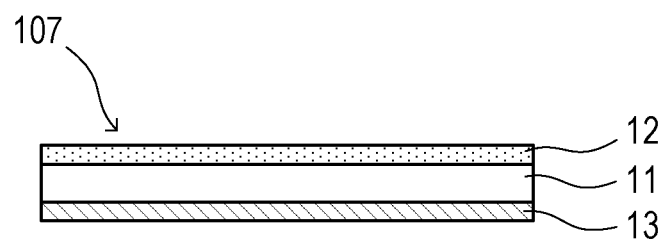
FIG. 7 is a side sectional view showing a modified example of a sheet member.

For example, as the sheet member 107 shown in FIG. 7, the phosphorescent layer 12 may be provided on one surface of the substrate 11 and the reflection layer 13 may be provided on another surface. The phosphorescent layer 12 and the reflection layer 13 can be provided on the substrate 11 by the above-described method such as printing. The phosphorescent layer 12 and the reflection layer 13, which need to overlap each other at least partially in the thickness direction, may have parts not overlapping each other, or may form patterns and the like as shown in FIG. 4 and FIG. 5.

The invention claimed is:

1. A sheet member comprising:
   a sheet-shaped substrate with a transmissive property;
   a phosphorescent layer provided on a surface of the substrate and containing a phosphorescent material; and
   a reflection layer provided on a surface of the phosphorescent layer on a side opposite to a side where the substrate is positioned, the reflection layer comprising at least one of a metal deposited film or an aluminum foil,
   wherein, with respect to a breadth direction of the substrate, the phosphorescent layer is provided on the substrate in a first area where the reflection layer is provided and in a second area where the reflection layer is not provided.

2. The sheet member according to claim 1, wherein the reflection layer forms a figure, a pattern, a character, or a symbol.

3. The sheet member according to claim 1, wherein the phosphorescent layer is visible from a side of the sheet member opposite a side of the sheet member on which the reflection layer is arranged.

4. A sheet member comprising:
   a sheet-shaped substrate with a transmissive property;
   a phosphorescent layer provided on a surface of the substrate and containing a phosphorescent material, the phosphorescent layer including a first area and a second area; and
   a reflection layer provided on a surface of the phosphorescent layer on a side opposite to a side where the substrate is positioned, at least a surface of the reflection layer that faces the phosphorescent layer comprising white paper,
   wherein the reflection layer is provided in the first area and the reflection layer is not provided in the second area.

* * * * *